(12) United States Patent
Ouchi

(10) Patent No.: US 10,106,128 B2
(45) Date of Patent: Oct. 23, 2018

(54) WIPER ARM

(71) Applicant: NIPPON WIPER BLADE CO., LTD., Saitama (JP)

(72) Inventor: Katsuhiro Ouchi, Saitama (JP)

(73) Assignee: NIPPON WIPER BLADE CO., LTD., Saitama (JP)

( * ) Notice: Subject to any disclaimer, the term of this patent is extended or adjusted under 35 U.S.C. 154(b) by 0 days.

(21) Appl. No.: 15/117,608

(22) PCT Filed: Feb. 17, 2015

(86) PCT No.: PCT/JP2015/054231
§ 371 (c)(1),
(2) Date: Aug. 9, 2016

(87) PCT Pub. No.: WO2015/125764
PCT Pub. Date: Aug. 27, 2015

(65) Prior Publication Data
US 2016/0355159 A1    Dec. 8, 2016

(30) Foreign Application Priority Data
Feb. 19, 2014    (JP) ................... 2014-030066

(51) Int. Cl.
*B60S 1/34* (2006.01)

(52) U.S. Cl.
CPC ............ *B60S 1/3465* (2013.01); *B60S 1/345* (2013.01); *B60S 1/3436* (2013.01); *B60S 1/3468* (2013.01)

(58) Field of Classification Search
CPC ...... B60S 1/3431; B60S 1/3436; B60S 1/345; B60S 1/3456; B60S 1/3413; B60S 1/3465; B60S 1/3468

USPC ...................................... 15/250.351, 250.352
See application file for complete search history.

(56) References Cited

U.S. PATENT DOCUMENTS

| 4,170,804 | A | * | 10/1979 | Scotcher | ............... | B60S 1/34 |
|||||||15/250.34|
| 4,947,508 | A | * | 8/1990 | Bauer | .................. | B60S 1/34 |
|||||||15/250.352|
| 5,423,106 | A | * | 6/1995 | Peyret | ................... | B60S 1/34 |
|||||||15/250.31|

(Continued)

FOREIGN PATENT DOCUMENTS

| FR | 2050604 | * | 3/1971 |
| JP | 62-46743 A | | 2/1987 |

(Continued)

*Primary Examiner* — Gary Graham
(74) *Attorney, Agent, or Firm* — Muncy, Geissler, Olds & Lowe, P.C.

(57) ABSTRACT

There is provided a wiper arm rotatably connecting an arm body to an arm head and including a spring member provided between the arm head and the arm body, the thickness of which is decreased while its mechanical strength is sufficiently maintained. A gap section reaching a pivot shaft hole is provided in a head connection section of a retainer. A recess is provided on a pivot shaft section of an arm head. During the retainer rotates, a straight section of the coil spring moves from the gap section to the recess. When the retainer reaches its upright position, the straight section is disposed within the recess. The pivot shaft section includes a projection disposed within the gap section and in contact with the divided pieces, on the both sides of the gap section.

2 Claims, 16 Drawing Sheets

(56) References Cited

U.S. PATENT DOCUMENTS

| | | | | |
|---|---|---|---|---|
| 7,559,109 B2 * | 7/2009 | Lorenz | ..................... | B60S 1/34 |
| | | | | 15/250.351 |
| 8,042,219 B2 * | 10/2011 | Stahlhut | ................ | B60S 1/3452 |
| | | | | 15/250.19 |
| 9,539,985 B2 * | 1/2017 | Mouth | .................. | B60S 1/3452 |

FOREIGN PATENT DOCUMENTS

| JP | 2000-168505 A | 6/2000 |
|---|---|---|
| JP | 2009-045971 A | 3/2009 |
| JP | 2009-78782 A | 4/2009 |

* cited by examiner

PRIOR ART

PRIOR ART

PRIOR ART

WIPER ARM

TECHNICAL FIELD

The present invention relates to a wiper arm rotatably connecting an arm body to an arm head and including a spring member provided between the arm head and the arm body.

BACKGROUND ART

A wiper device generally includes a wiper blade for wiping a surface to be wiped such as a glass surface of a vehicle, a wiper arm for retaining the wiper blade, and driving means (a drive motor) for driving the wiper arm. The wiper arm includes an arm head linked to the driving means, an arm body rotatably connected to the arm head, and a spring member provided between the arm head and the arm body and retains the wiper blade through the arm body.

FIG. 13 and FIG. 14 illustrate such a conventional wiper arm 101. As illustrated in the drawings, the wiper arm 101 includes an arm head 102, a retainer 103 configuring an arm body, and a coil spring 104 interposed between the arm head 102 and the retainer 103.

As illustrated also in FIG. 15, the arm head 102 is provided with a pivot shaft 102A. On the other hand, as illustrated also in FIG. 16, a pivot shaft hole 103A is provided in a base end of the retainer 103. The pivot shaft 102A is rotatably fit into the pivot shaft hole 103A. With this construction, the retainer 103 is rotatably connected to the arm head 102 and can be selectively positioned at its normal use position wherein it extends almost straight from the arm head 102 as illustrated in FIG. 13 or at its upright position wherein it stands with respect to the arm head 2 as illustrated in FIG. 14.

CITATION LIST

Patent Literature

[PTL1]
Japanese laid-open patent application No. 2009-045971

SUMMARY OF INVENTION

Technical Problem

In such a wiper arm 101, when the retainer 103 rotates from its normal use position to its upright position, a portion of the coil spring 104 comes close to the pivot shaft 102A. Accordingly, in the conventional wiper arm 101, to prevent the coil spring 104 from contacting with the base end of the retainer 103 or the shaft section 102A of the arm head 102 when the retainer 103 is disposed at its upright position, a recess 103B for housing the portion of the coil spring 104 is formed d in a lower surface of the base end of the retainer 103, and a hook section 104A curved downward is provided at a portion adjacent to the pivot shaft section 102A of the coil spring 4.

The hook section 104 of the coil spring 4A, however, protrudes below the retainer 103 and the arm head 102 when the retainer 103 is disposed at its normal use position. As a result, the thickness of the wiper arm 101 increases.

In view of the foregoing, it is an object of the present invention to provide a wiper arm rotatably connecting an arm body to an arm head and including a spring member provided between the arm head and the arm body, the thickness of which is decreased while its mechanical strength is sufficiently maintained.

Solution to Problem

The present invention provides a wiper arm including: an arm head having a pivot shaft section; an arm body including a pivot shaft hole into which said pivot shaft section is rotatably fit; and a spring member provided between said arm head and said arm body, wherein said arm body includes a gap section which reaches said pivot shaft hole so that a part of said spring member is disposed within said gap section when said arm body rotates around said pivot shaft section.

A recess may be formed on said pivot shaft section and is disposed at a position corresponding to said gap section so that a part of said spring member is disposed within said recess when said arm body rotates around said pivot shaft section Said arm body may includes divided pieces separated by the gap section, and a reinforcing section for reinforcing mechanical strength of said divided pieces may be provided between said divided pieces.

Said reinforcing section may be disposed within said gap section and be in contact with said divided pieces on the both sides thereof.

Said reinforcing section may be provided on said pivot shaft.

Said reinforcing section may be a bridge section connecting said divided pieces, and said bridge section may be provided on said divided pieces so as to face said pivot shaft hole.

Said reinforcing section may be provided adjacent to the free ends of said divided pieces.

Advantageous Effects of Invention

According to the present invention, the gap section (for example, gap section 33) that reaches the pivot shaft hole (for example, pivot shaft hole 31) is formed in the arm body (for example, retainer 3) of the wiper arm (for example, wiper arm 1 or wiper arm 40), and a part (for example, straight section 4C) of the spring member (for example, coil spring 4) can be disposed within the gap section. Accordingly, when the arm body rotates, the part of the spring member can move toward the inside of the wiper arm to reach the pivot shaft hole. Furthermore, the recess (for example, recess 14A) provided at a position corresponding to the gap section is provided on the pivot shaft section (for example, pivot shaft section 14) of the arm head (for example, arm head 2), so that the part of the spring member can move to reach the inside of the recess. Therefore, there is no need to provide a curved part (for example, hook section 104A) in the spring member to prevent the spring member from contacting with other parts of the wiper arm, and the entire of the spring member can be disposed within the arm body and the arm head regardless of the rotational position of the arm body. As a result, it is possible to reduce the thickness of the wiper arm.

Additionally, the reinforcing section (for example, projection 14B or bridge section 41) that reinforces the mechanical strength of the divided pieces (for example, divided pieces 34, 35) separated by the gap section is provided to compensate the decrease of mechanical strength due to the gap section. This enables to reduce the thickness of the wiper arm while maintaining sufficient mechanical strength. In particular, if the reinforcing section (for example, projection 14B) is disposed inside the gap section so as to be in contact with the divided pieces on the both side, it is possible to prevent the divided pieces from deforming and effectively reinforce the mechanical strength of the divided pieces.

If the reinforcing section (for example, projection 14B) is provided on the pivot shaft section, the reinforcing section is securely prevented from contacting with the spring member and is appropriately config.d to be disposed within the cutout section.

DESCRIPTION OF EMBODIMENTS

Figure 1:
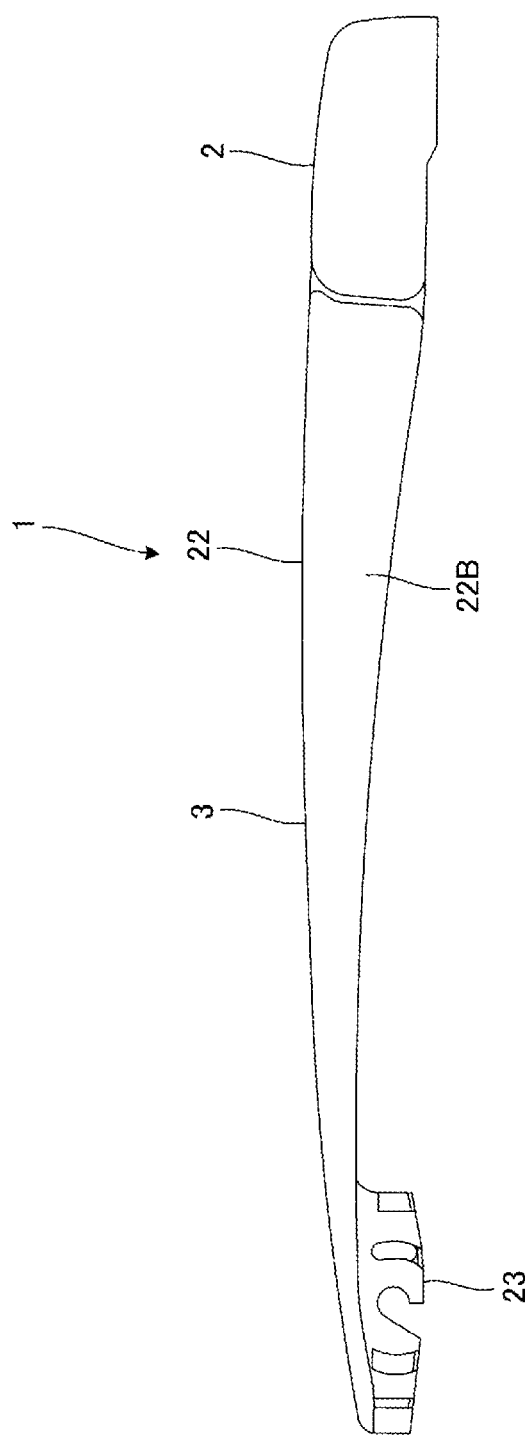
FIG. 1 is a side view illustrating a wiper arm according to a first embodiment of the present invention.

The present invention will now be described, by way of example, with reference to the accompanying drawings.

FIGS. 1 to 7 illustrate a wiper arm 1 of a first embodiment of the present invention. As illustrated in the drawings, the wiper arm 1 includes an arm head 2, a retainer 3 rotatably connected to the arm head 2 and a coil spring 4 interposed between the arm head 2 and the retainer 3.

Figure 8:
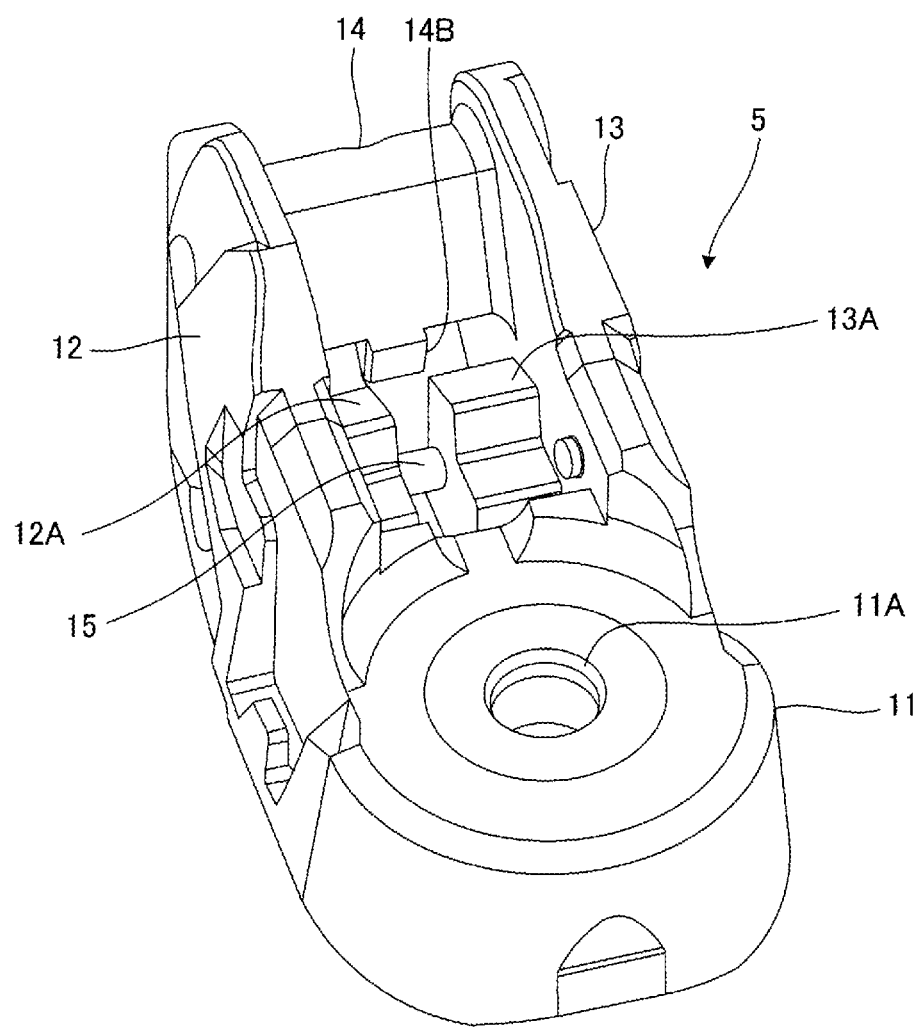
FIG. 8 is a perspective view of an arm head body viewed from above.
Figure 9:
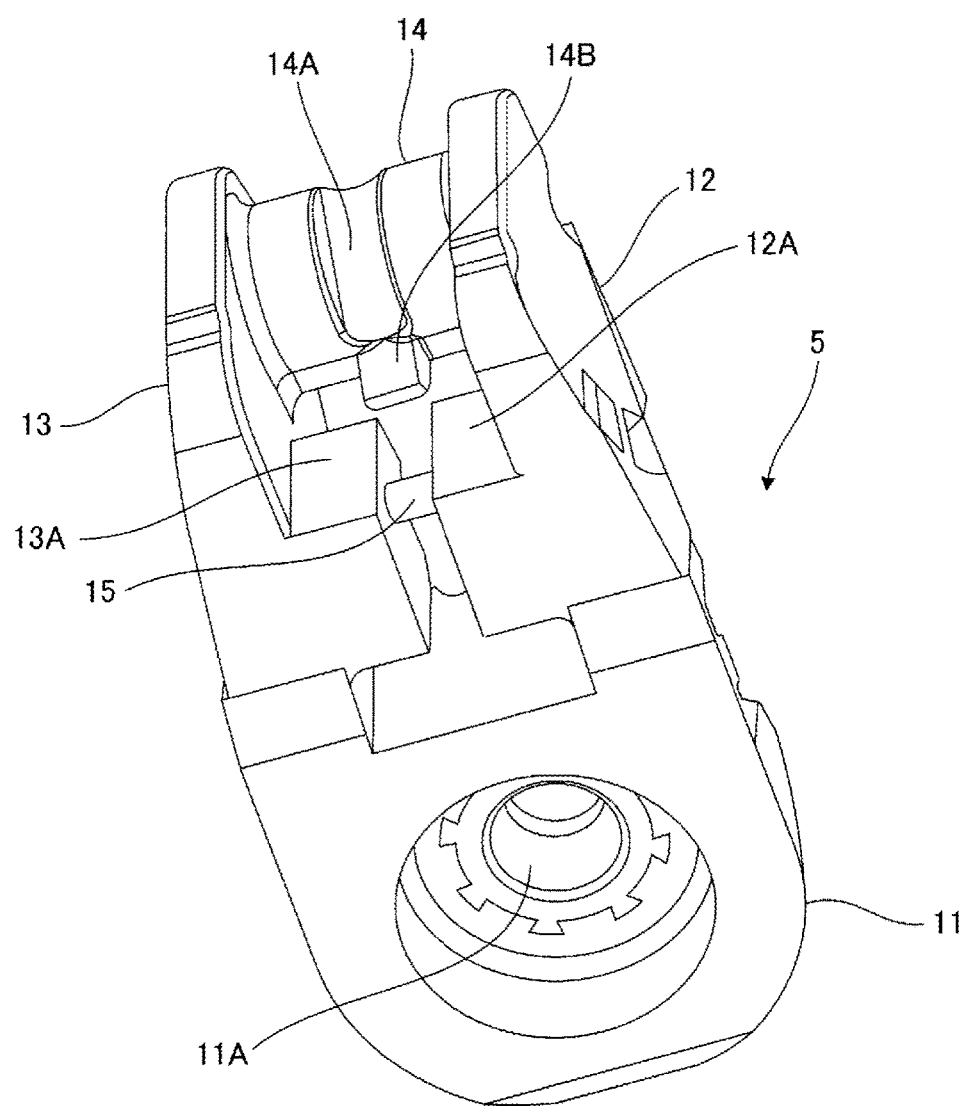
FIG. 9 is a perspective view of the arm head body viewed from below.

The arm head 2 is a member that constitutes a base end (rear end) part of the wiper arm 1 and is comprised of a head body 5 and a head cover 6 covering the head body 5. As individually illustrated in FIG. 8 and FIG. 9, the head body 5 includes a substantially cylindrical base end 11 and arm sections 12, 13 that are located on both sides and extend forward (toward the retainer 3) from the base end 11. A pivot shaft section 14 and a spring locking section 15 are disposed between the arm sections 12 and 13.

A connecting shaft hole 11A is formed at the center of the base end 11 and penetrates the base end 11 vertically. A connecting shaft of a drive mechanism (not illustrated) is joined to this connecting shaft hole 11A so that the wiper arm 1 and the drive mechanism are linked.

The pivot shaft section 14 has a substantially semicylindrical shape and is disposed in the vicinity of the tip portions of the arm sections 12, 13. A groove-shaped recess 14A is formed in a curved lower surface of the pivot shaft section 14 and extends in the front-rear direction (in the longitudinal direction of a wiper arm 1). A projection 14B is provided in the vicinity of the rear end of the recess 14A of the pivot shaft section 14 (the end section facing the base end 11) and extends in the outer circumferential direction of the pivot shaft section 14.

The spring locking section 15 is disposed between thick sections 12A, 13A provided in the vicinities of the base ends of the arm sections 12, 13. The spring locking section 15 is thus located in the vicinity of a lower end of the head body 5 so as to be positioned below and behind the pivot shaft section 14 (on the side facing the base end 11).

As illustrated in FIGS. 1 to 7, the retainer 3 is a long member forming an intermediate to front end part of the wiper arm 1 and includes a head connection section 21 disposed on its side facing the base end (rear end), a body section 22 extending from the head connection section 21, and a blade connection section 23 provided at the tip (front end) of the body section 22. The blade connection section 23 is a portion to which a wiper blade (not illustrated) is connected so that the retainer 3 can support the wiper blade.

The body section 22 includes an upper wall 22A and side walls 22B, 22C extending downward from the both sides of the upper wall 22A. The upper wall 21 and the side walls 22B, 22C form a U-shaped space section 22D. A spring locking section 24 is provided on the downward surface of the upper wall 22A and is disposed within the space section 22D.

Figure 6:
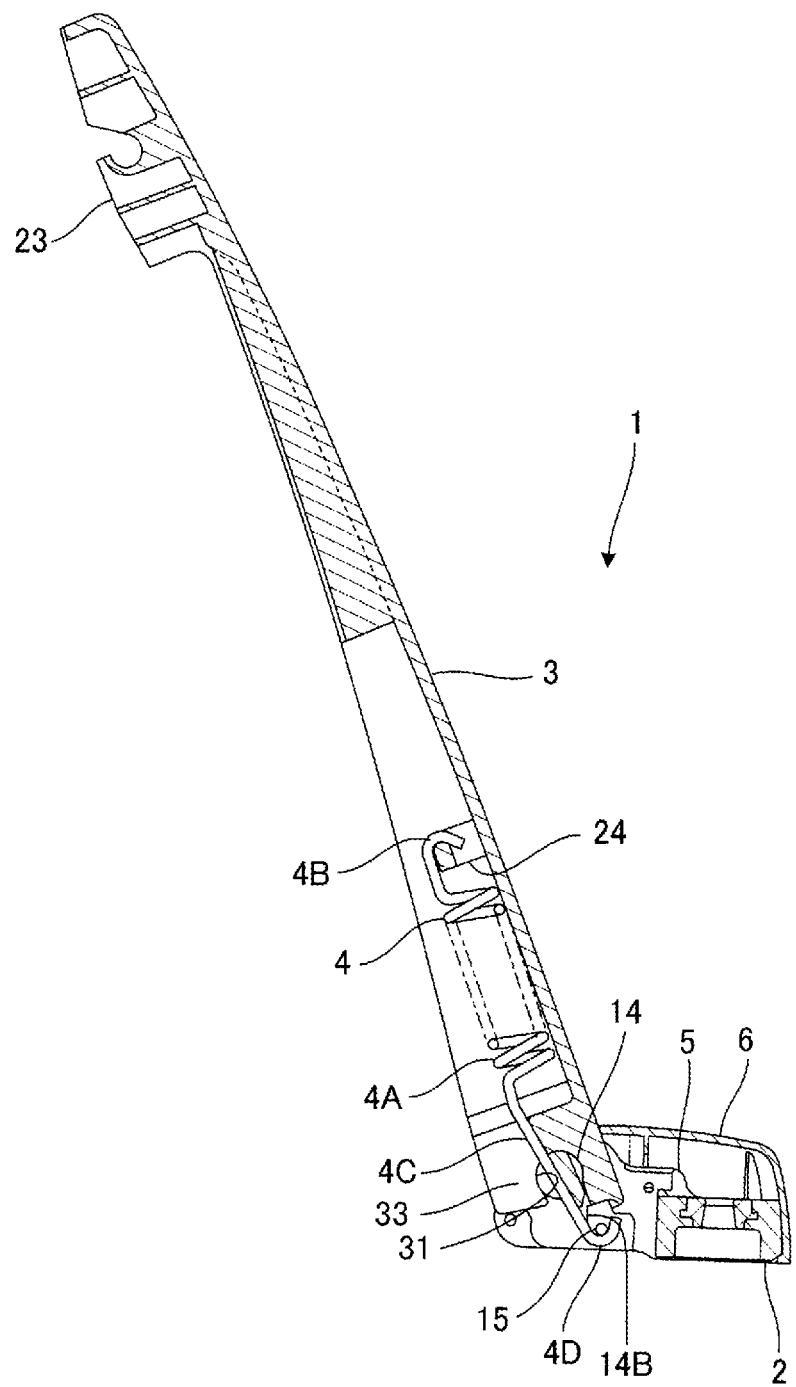
FIG. 6 is a sectional view illustrating the wiper arm according to the first embodiment of the present invention wherein the retainer is in its upright position.
Figure 7:
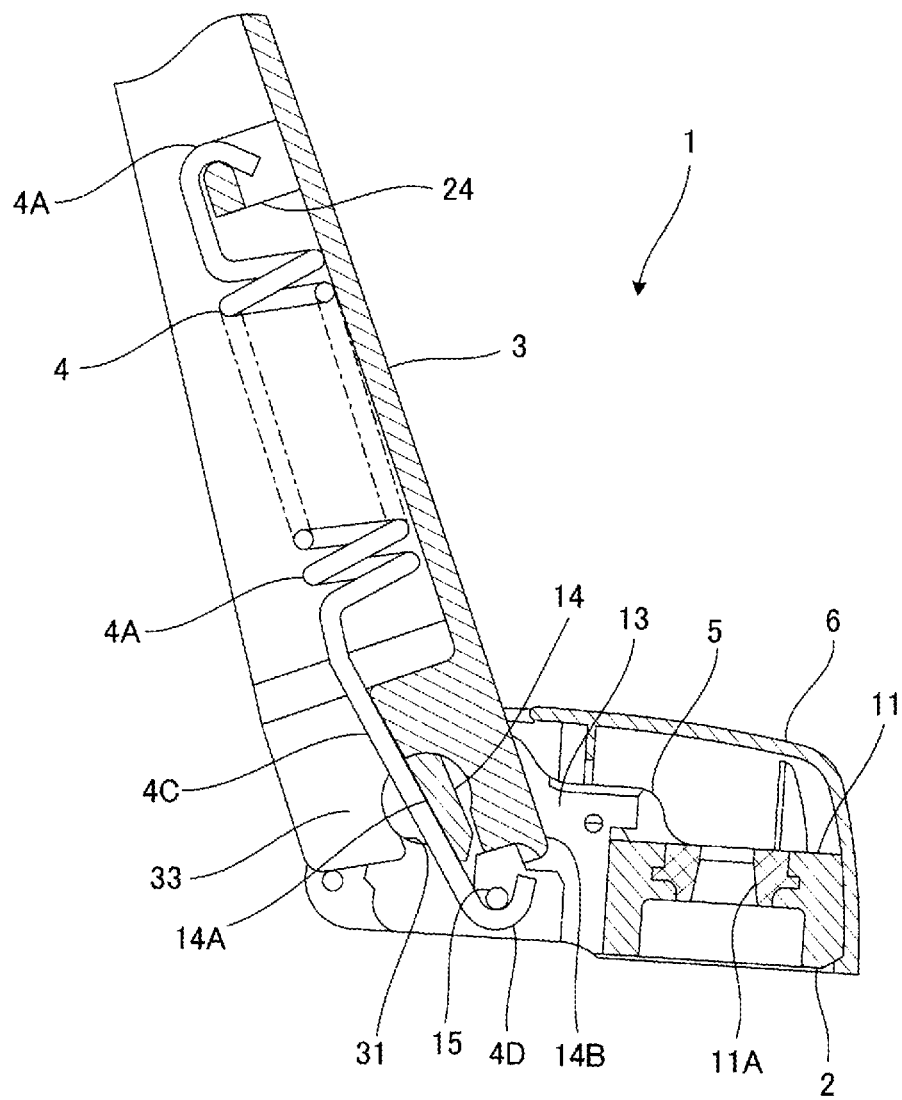
FIG. 7 is a sectional view illustrating a part of the wiper arm wherein the retainer is in its upright position.
Figure 10:
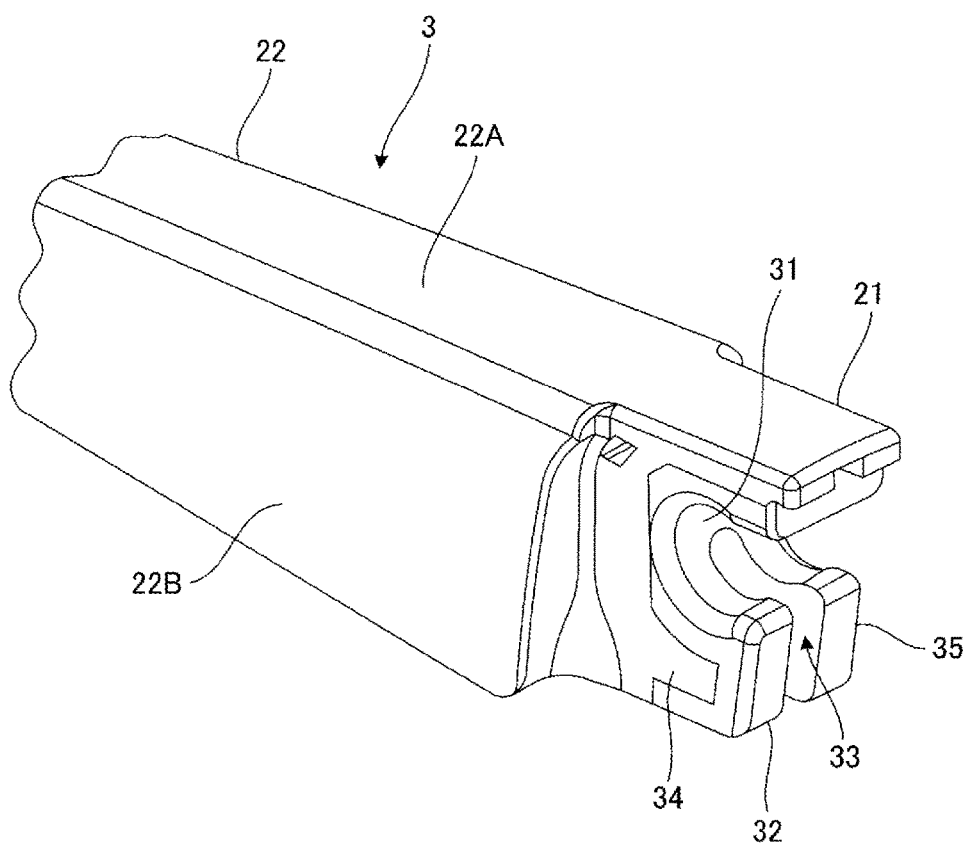
FIG. 10 is a perspective view illustrating the vicinity of a base end of the retainer.

As illustrated in FIG. 10 in detail, a pivot shaft hole 31 in the head connection section 21 and penetrates the head connection section 21 in the transverse direction. The pivot shaft hole 31 has a C-shaped cross-sectional shape having an opening cut out on a side surface facing the arm head 2. The pivot shaft section 14 of the arm head 2 is rotatably fit in the pivot shaft hole 31 from this opening. The retainer 3 is thus rotatably supported around the pivot shaft section 14 with respect to the arm head 2 and is rotated between its normal use position (the position in which the wiper blade supported by the wiper arm 1 wipes a surface to be wiped) wherein the retainer 3 extends almost straight from the arm head 2 as illustrated in FIGS. 1 to 3 and its upright position (the position in which the wiper arm 1 is in a so-called lock back state) wherein the retainer 3 is upright with respect to the arm head 2 as illustrated in FIGS. 6 and 7.

The portion of the head connection section 21 below the pivot shaft hole 31 forms a bottom portion 32. A cutout-shaped gap section 33 is formed in this bottom portion 32 and extends in the vertical direction. The gap section 33 opens toward the arm head 2 and extends in the vertical direction from the lower surface of the head connection section 21 to the inner circumferential surface of the pivot shaft hole 31. The bottom portion 32 of the head connection section 21 is thus separated into divided pieces 34, 35 on the both right and left sides.

Figure 4:
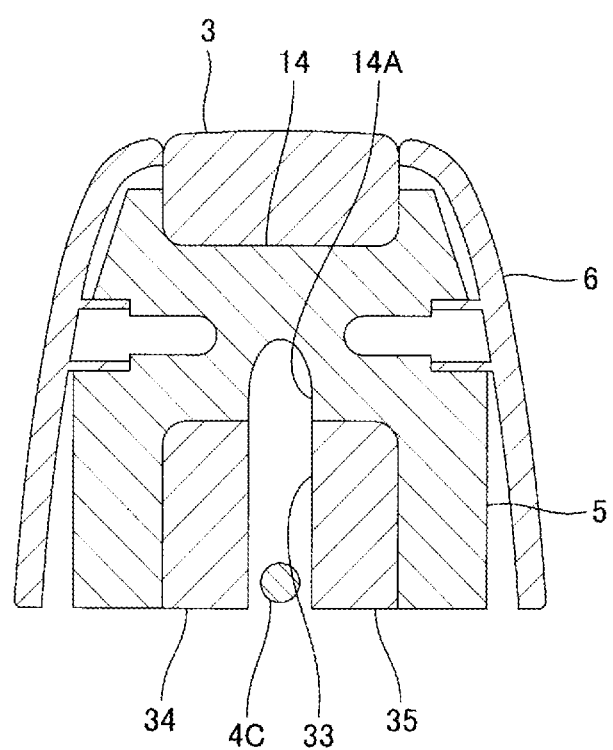
FIG. 4 is a sectional view taken along 4-4 in FIG. 3 and illustrates a cross-section of a connecting part of an arm head and the retainer.

As illustrated in FIG. 4, the gap section 33 of the head connection section 21 and the recess 14A of the pivot shaft section 14 are formed at positions corresponding to each other and form a vertically continuous slit. As described later in detail, a part (straight section 4C) of the coil spring 4 is disposed within the slit and is movable vertically within the slit in response to the rotational operation of the retainer 3.

Figure 2:
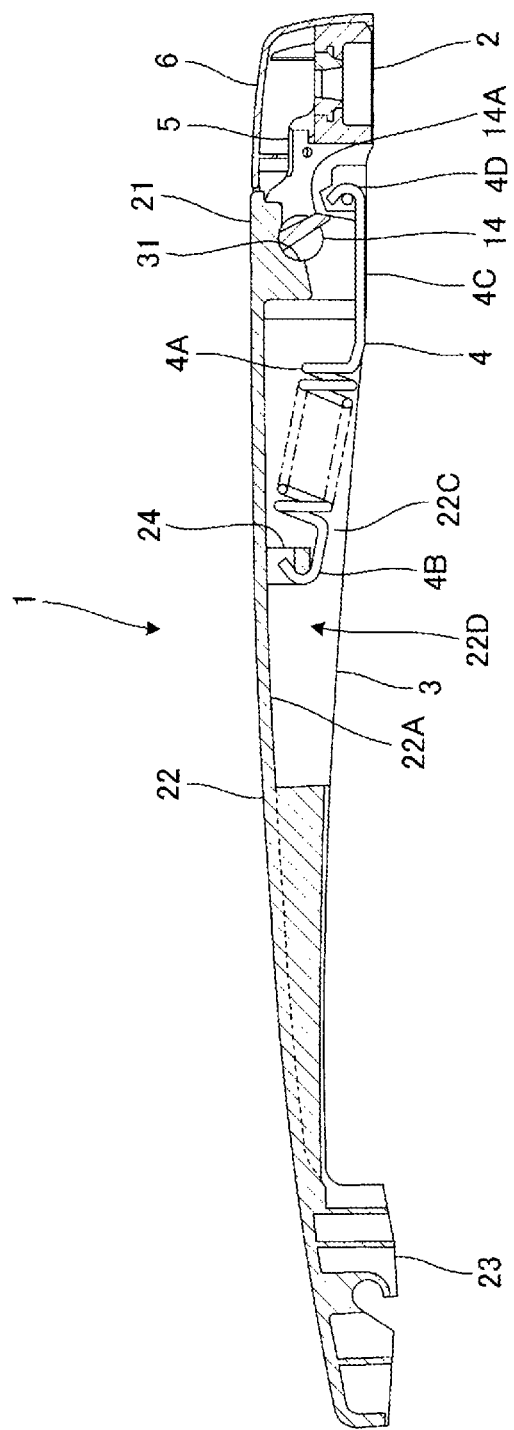
FIG. 2 is a sectional view illustrating the wiper arm wherein a retainer is in its normal use position.
Figure 3:
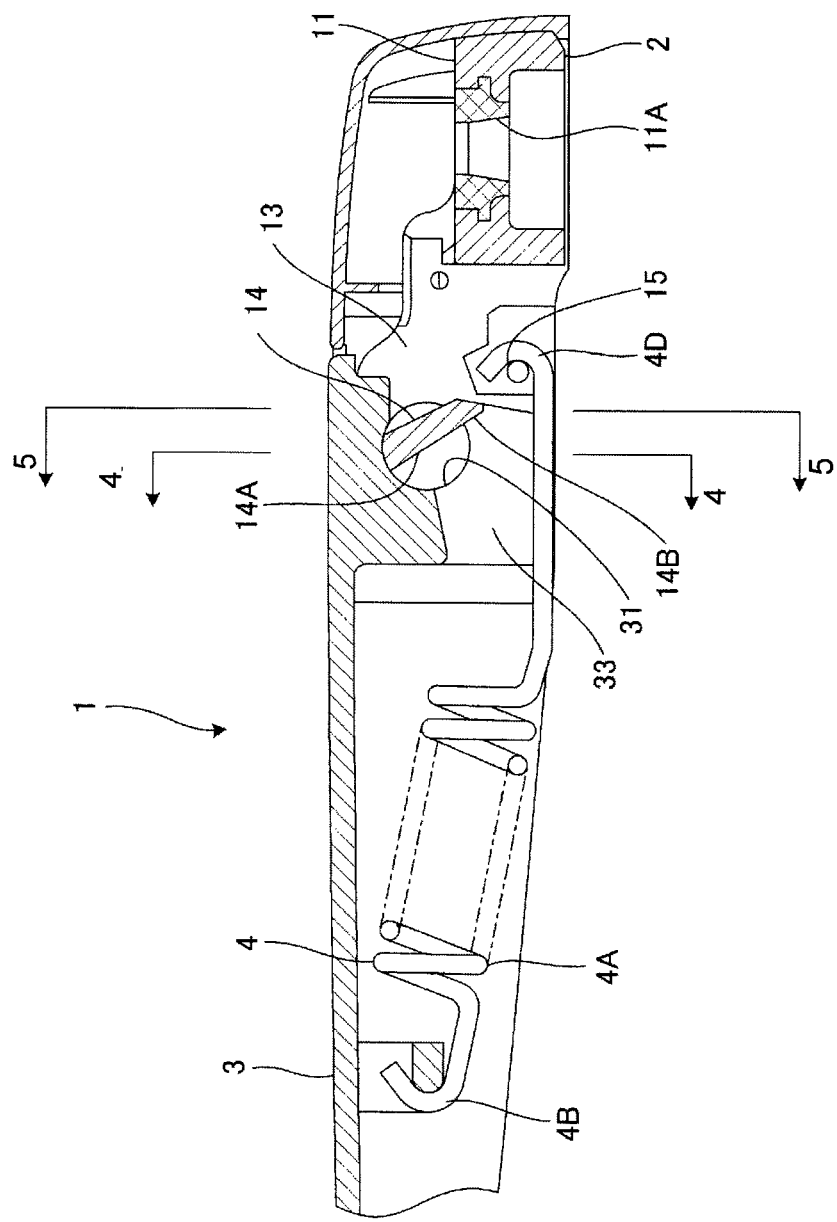
FIG. 3 is a sectional view illustrating a part of the wiper arm wherein the retainer is in its normal use position.
Figure 5:
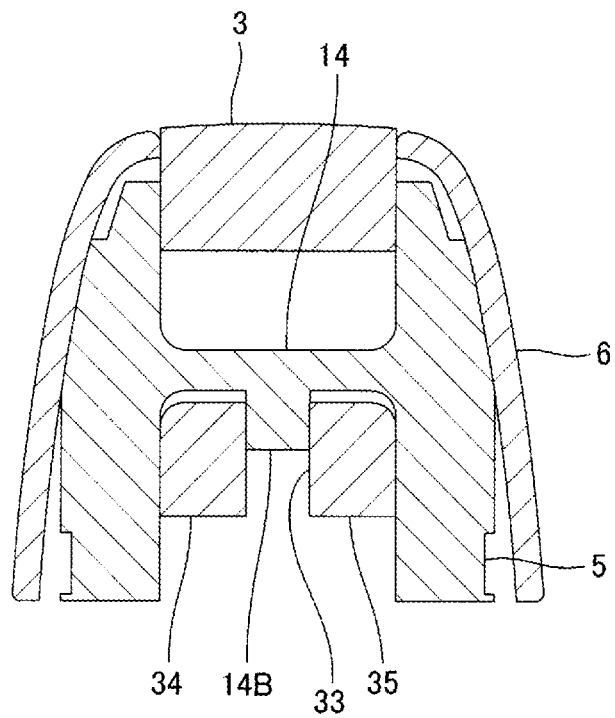
FIG. 5 is a sectional view taken along 5-5 in FIG. 3 and illustrates a cross-section of a rear end of the retainer.

As illustrated also in FIG. 5, when the retainer 3 is in its normal use position, the projection 14B of the shaft section 14 of the arm head 2 is disposed within the gap section 33 of the head connection section 21 of the retainer 3 (see FIGS. 2 and 3). The width of the projection 14B is substantially equal to the width of the gap section 33. The sides of the projection 14B are thus in contact with the divided pieces 34, 35 on the both sides of the gap section 33. Accordingly, the projection 14B functions as a reinforcing section for reinforcing the divided pieces 34, 35, the mechanical strengths of which are weakened due to division into the two half sections. Specifically, the projection 14B is disposed within the vicinities of the free ends (the rear ends) of the divided pieces 34, 35 where the divided pieces 34, 35 may most largely deform. This enables to effectively prevent the divided pieces 34, 35 from deforming. As a result, the mechanical strength of the divided pieces 34, 35 can be effectively reinforced.

As illustrated in FIGS. 2 and 3, the coil spring 4 includes a coil-shaped spring body 4A, an engagement section 4B extending from a first end of the spring body 4A, the straight section 4C extending from a second end of the spring body 4A, and an engagement section 4D formed on the tip portion of the straight section 4C. The engagement section 4B and the engagement section 4D are engaged with the spring locking section 24 of the retainer 3 and the spring locking section 15 of the arm head 2, respectively. The coil spring 4 thus applies suitable spring force between the arm head 2 and the retainer 3.

As illustrated in FIGS. 1 to 3, when the retainer 3 in its normal use position rotates in such a direction as to be erected with respect to the arm head 2 (in the clockwise rotational direction in the drawing), the coil spring 4 applies force against the rotation of the retainer 3 (force in the counter clockwise rotational direction in the drawing). The wiper blade retained by the retainer 3 is thus suitably pressed against the surface to be wiped. On the other hand, as illustrated in FIGS. 6 and 7, when the retainer 3 in its upright position rotates toward its normal use position (in the counter clockwise rotational direction in the drawing) with respect to the arm head 2, the coil spring 4 applies force to the retainer 3 to return it to its upright position (in the clockwise rotational direction in the drawing). The retainer 3 is thus suitably continued to be retained in its upright position.

The spring body 4A of the coil spring 4 is housed in the space section 22D of the retainer 3. On the other hand, the straight section 4C of the coil spring 4 extends from the spring body 4 toward the spring locking section 15 of the arm head 2. When the retainer 3 is in its normal use position, the straight section 4C is disposed in the vicinity of the lower end of the gap section 33 of the arm head 2 and extends along the lower ends of the retainer 3 and the arm head 2 (see FIGS. 2 to 4). Accordingly, even when the retainer 3 is in its normal use state, the entire of the coil spring 4 including the straight section 4C is housed within the retainer 3 and the arm head 2 so that there is no portion of the coil spring 4 protruding from the lower ends of the retainer 3 and arm head 2.

On the other hand, when the retainer 3 rotates toward its upright position, the straight section 4C moves upwardly within the slit which is formed of the gap section 33 of the retainer 3 and the recess 14A of the pivot shaft section 14. When the retainer 3 reaches its upright position, the straight section 4C is disposed within the recess 14A. Accordingly, the coil spring 4 does not interfere with any parts of the retainer 3 and the arm head 2 during the rotational operation.

Figure 13:
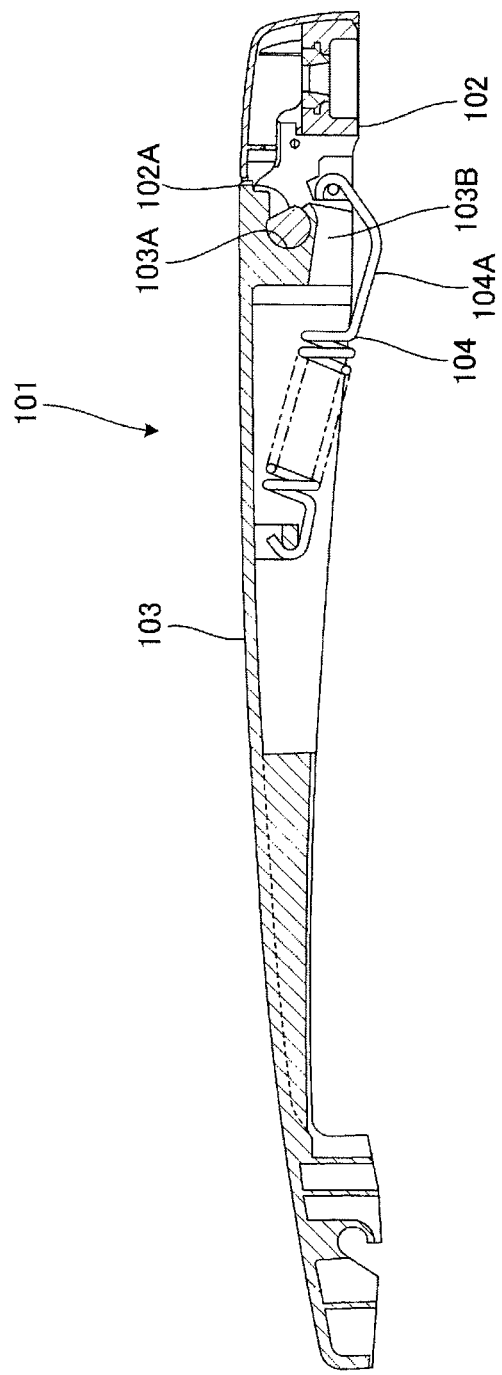
FIG. 13 is a sectional view illustrating a conventional wiper arm wherein a retainer is in its normal use position.
Figure 14:
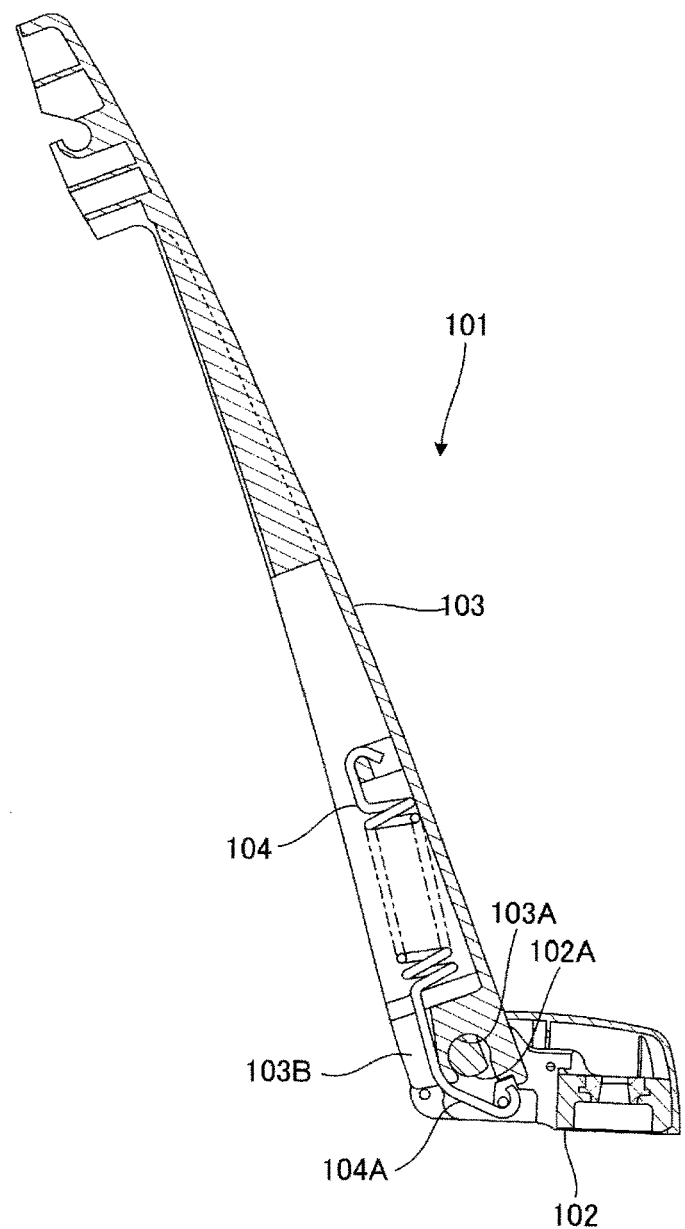
FIG. 14 is a sectional view illustrating the conventional wiper arm wherein the retainer is in its upright position.
Figure 15:
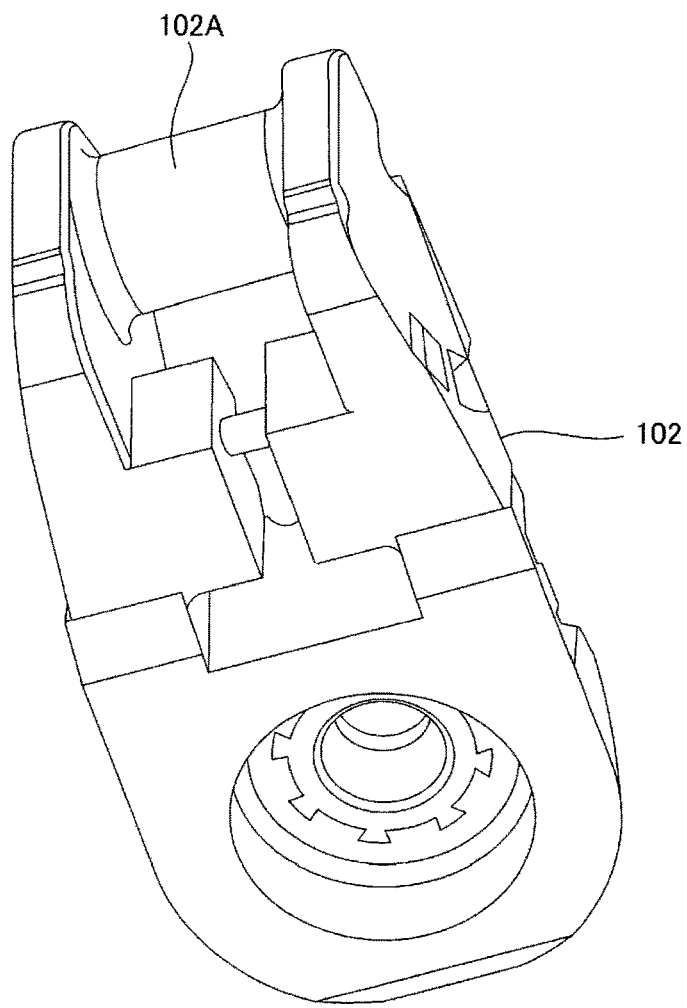
FIG. 15 is a perspective view illustrating an arm head of the conventional wiper arm.
Figure 16:
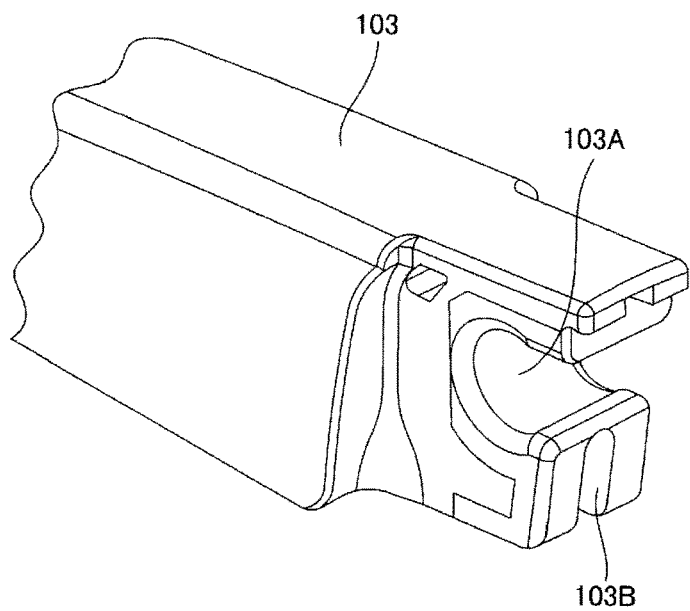
FIG. 16 is a perspective view illustrating a part of the retainer of the conventional wiper arm.

As thus far described, since the wiper arm 1 of the present invention includes the gap section 33, which is formed in the bottom portion 32 of the head connection section 21 of the retainer 3 and extends from the bottom portion surface of the head connection section 21 to the inner circumferential surface of the pivot shaft hole 31, and the recess 14A formed on the pivot shaft section 14 of the arm head 2, a part (straight section 4C) of the coil spring 4 moves vertically within the slit formed of the gap section 33 and the recess 14A during the retainer 3 rotates toward its upright position and is disposed within the recess 14A of the pivot shaft section 14 when the retainer 3 reaches its upright position. Accordingly, although the coil spring 4 does not include a hook section in the conventional technology (see the hook section 104A in FIGS. 13 and 14), the coil spring 4 does not come into contact with the pivot shaft section 14 of the arm head 2. In addition, since the conventional hook portion is replaced with the straight section, the entire of the coil spring 4 can be housed within the retainer 3 and the arm head 2 when the retainer 3 is in its normal use position. As a result, the thickness of the wiper arm 1 is reduced.

Since the projection 14B provided on the pivot shaft section 14 is disposed between the divided pieces 34, 35 on the both sides of the gap section 33 of the retainer 3 and functions as the reinforcing section for reinforcing the mechanical strength of the divided pieces 34, 35, it is possible to suitably compensate the reduction in the mechanical strength due to the gap section 33 in the head connection section 21 of the retainer 3. The thickness of the wiper arm 1 is thus reduced without lowering the mechanical strength of the wiper arm 1.

Figure 11:
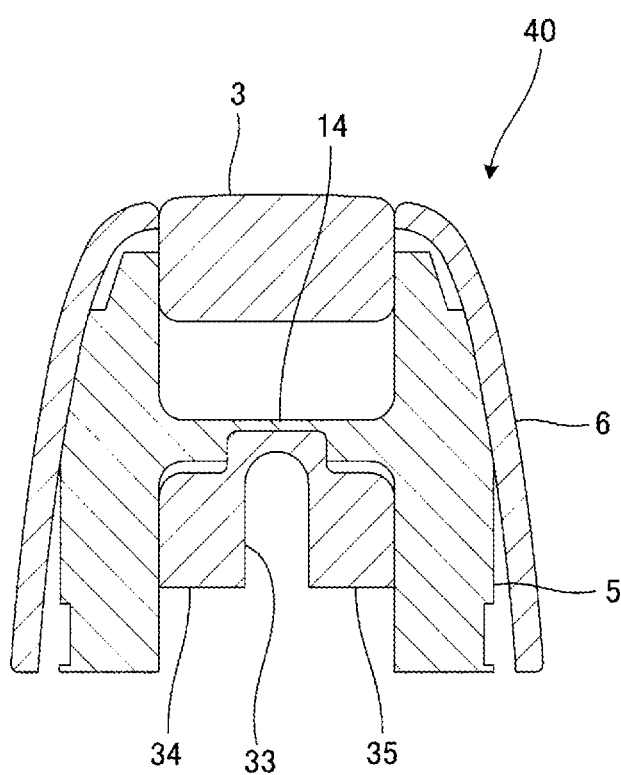
FIG. 11 is a sectional view of a wiper arm according to a second embodiment of the present invention and illustrates a cross-section of a rear end of a retainer.
Figure 12:
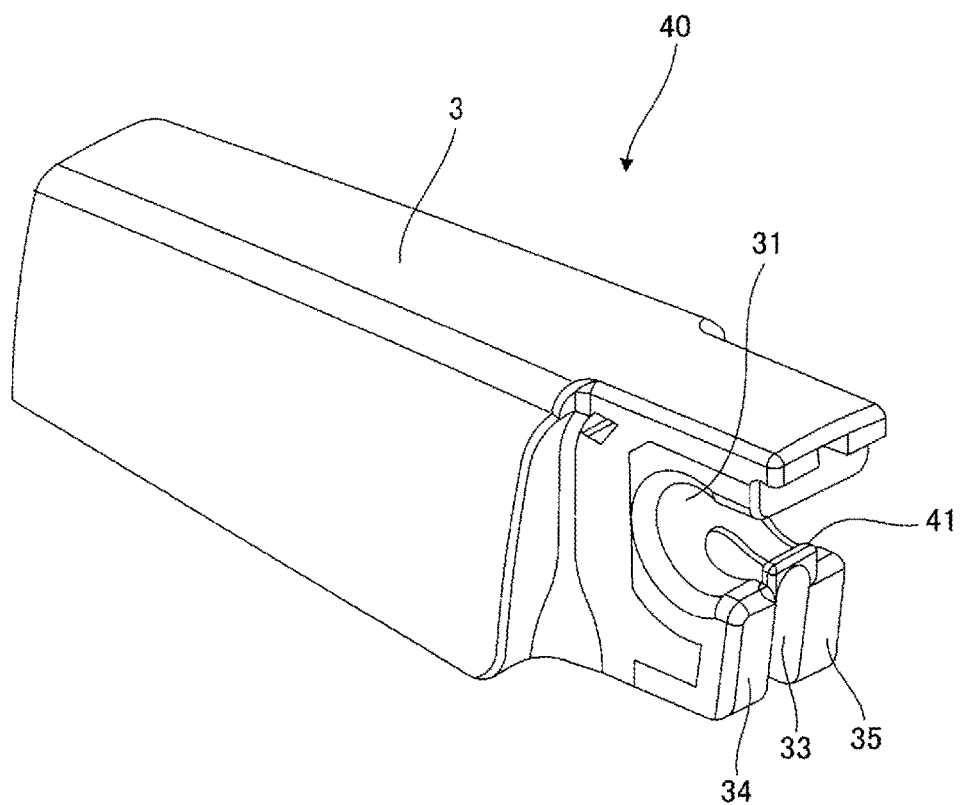
FIG. 12 is a perspective view illustrating a part of the retainer.

FIGS. 11 and 12 illustrate a wiper arm 40 of a second embodiment of the present invention. The wiper arm 40 of this embodiment is different from the wiper arm 1 of the above embodiment in that it includes a bridge section 41 which bridges the divided pieces 34 and 35 and is disposed over the gap section 33 in place of the projection 14B provided in the shaft section 14 of the arm head 2. As illustrated in the drawings, the bridge section 41 is disposed on the sides of the divided pieces 34, 35 facing the pivot shaft hole 31 (namely, the side opposite to the side on which the straight section 4C of the coil spring 4 is inserted into gap section 33 (the lower surface side of a retainer 3)) and connects the divided pieces 34, 35. In the wiper arm 40, the bridge section 41 functions as a reinforcing section and can reinforce the mechanical strength of the divided pieces 34, 35.

LIST OF REFERENCE NUMERALS 1 wiper arm
2 arm head
3 retainer
4 coil spring
5 head body
6 head cover
11 base end of head body
12 arm section of head body
13 arm section of head body
14 pivot shaft section of head body
14A recess of pivot shaft section
14B projection of pivot shaft section (reinforcing section)
15 spring locking section of head body
21 head connection section of retainer 22 body section of retainer
23 blade connection section of retainer
31 pivot shaft hole of head connection section
32 bottom portion of head connection section
33 gap section of head connection section
34 divided piece of head connection section
35 divided piece of head connection section

The invention claimed is:

1. A wiper arm comprising:

an arm head having a pivot shaft section;

an arm body including a pivot shaft hole into which said pivot shaft section is rotatably fit; and a spring member provided between said arm head and said arm body, said arm body including a gap section which reaches said pivot shaft hole so that a part of said spring member is disposed within said gap section when said arm body rotates around said pivot shaft section, wherein a recess is formed on said pivot shaft section and is disposed at a position corresponding to said gap section so that a part of said spring member is disposed within said recess when said arm body rotates around said pivot shaft section, wherein said arm body includes divided pieces separated by the gap section, wherein a reinforcing section for reinforcing mechanical strength of said divided pieces is provided between said divided pieces, wherein said reinforcing section is disposed within said gap section and is in contact with said divided pieces on the both sides thereof, and wherein said reinforcing section is provided on said pivot shaft.

2. The wiper arm according to claims 1, wherein said reinforcing section is provided adjacent to the free ends of said divided pieces.

* * * * *